(12) United States Patent
Liow et al.

(10) Patent No.: US 7,646,400 B2
(45) Date of Patent: Jan. 12, 2010

(54) METHOD AND APPARATUS FOR FORMING A PANORAMIC IMAGE

(75) Inventors: Yuen Khim Liow, Singapore (SG);
Siang Thia Goh, Singapore (SG);
Guoran Liu, Singapore (SG)

(73) Assignee: Creative Technology Ltd, Singapore (SG)

( * ) Notice: Subject to any disclaimer, the term of this patent is extended or adjusted under 35 U.S.C. 154(b) by 702 days.

(21) Appl. No.: 11/056,597

(22) Filed: Feb. 11, 2005

(65) Prior Publication Data
US 2006/0181619 A1 Aug. 17, 2006

(51) Int. Cl.
*H04N 7/00* (2006.01)
*H04N 5/262* (2006.01)
*H04N 5/222* (2006.01)

(52) U.S. Cl. .................. 348/36; 348/239; 348/333.11
(58) Field of Classification Search ........... 348/333.11, 348/333.12, 239, 36–39, 143, 281; 382/124; 396/222
See application file for complete search history.

(56) References Cited

U.S. PATENT DOCUMENTS

| | | | |
|---|---|---|---|
| 5,138,460 A | 8/1992 | Egawa | |
| 6,128,416 A * | 10/2000 | Oura | 382/284 |
| 6,552,744 B2 * | 4/2003 | Chen | 348/218.1 |
| 6,657,667 B1 * | 12/2003 | Anderson | 348/333.12 |
| 6,731,779 B2 * | 5/2004 | Satoh | 382/124 |
| 6,867,801 B1 * | 3/2005 | Akasawa et al. | 348/222.1 |
| 7,239,760 B2 * | 7/2007 | Di Bernardo et al. | 382/305 |
| 7,239,805 B2 * | 7/2007 | Uyttendaele et al. | 396/222 |
| 7,324,135 B2 * | 1/2008 | Ouchi et al. | 348/218.1 |
| 2001/0045986 A1 * | 11/2001 | Edwards | 348/239 |

FOREIGN PATENT DOCUMENTS

WO   WO 98/25402   6/1998

* cited by examiner

*Primary Examiner*—Nhan T Tran
*Assistant Examiner*—Trung Diep

(57) ABSTRACT

A method for forming a panoramic image using a camera. The method comprises taking a first photograph using the camera. On a display of the camera a blending area is formed. The blending area includes a part of a first image of the first photograph displayed on the display. The camera is moved before being prepared to take a second photograph. In the blending area only, a pixel matching process is performed for determining an alignment of the portion of the first image in the blending area and part of a second image of the second photograph in the blending area. A camera is also disclosed.

26 Claims, 9 Drawing Sheets

METHOD AND APPARATUS FOR FORMING A PANORAMIC IMAGE

FIELD OF THE INVENTION

This invention relates to a method and apparatus for forming a panoramic image and refers particularly, though not exclusively, to such a method and apparatus that facilitates the formation of a panoramic image with no portion of the panoramic image missing.

BACKGROUND OF THE INVENTION

There are three known methods for forming a panoramic image. In the first, the first frame is taken and displayed. The next frame is displayed live on the screen as the user moves the camera. The user moves that camera in such a way that there is a slight overlap in photograph information in the new frame to be taken. This is tedious, and sometimes confusing, as the user is observing the edge and there is no clear indication that the position of the shot has sufficient overlap for subsequent stitching operations.

In the second, video clips can be analyzed and a panoramic photograph created from it. This becomes difficult when the size of the photographs (e.g. 4 to 8 megapixels) and the number of photographs becomes large. Video takes more storage than multiple images, and requires more processing.

The third and final known method is to automatically perform the stitching each time a photograph is taken. If there is insufficient or no overlap, the stitching process will fail and the user will be prompted to take another photograph. Again, processing takes power and time.

SUMMARY OF THE INVENTION

In accordance with a first aspect there is provided a method for forming a panoramic image using a camera. The method comprises placing the camera into a panoramic image mode and taking a first photograph using the camera. On a display of the camera a blending area is formed. The blending area includes a part of a first image of the first photograph displayed on the display. The blending area is at a side of the display. The camera is moved before being prepared to take a second photograph. In the blending area only, a pixel matching process is performed for determining an alignment of the portion of the first image in the blending area and part of the second image of the second photograph in the blending area.

According to a second preferred aspect there is provided a computer useable medium comprising a computer program code that is configured to cause a processor in a camera to execute one or more functions to enable the performance of the above method.

According to a third preferred aspect there is provided a camera for taking a panoramic image. The camera comprises a body, a lens, a display, an image capturing device, a processor, a controller, and a memory. The display is for displaying images of photographs. The display comprises a blending area for determining an alignment of a portion of a first image in the blending area with a part of an image of a yet-to-be-taken second photograph.

For all aspects the blending area may be at a side of the display and may comprise a predetermined percentage of the first image, the predetermined percentage being the range of 5% to 25%. The red, green and blue values of all pixels in the blending area may be reduced to a fixed amount, the fixed amount being in the range 40% to 60%. It is preferably 45%. The red, green and blue values of the pixels of the portion of the first image in the blending area and the red, green and blue values of the pixels of the part of the second image in the blending area may be summed for display on the display prior to being reduced. After summing and reduction, pixels in the blending area may be further reduced by a set amount. The set amount may be 10%. In this way the red, green and blue values in the portion are at 90% being 45% from the first image and 45% from the second image.

The blending area may extend for the full length of the side of the display, the side being selected from: top, bottom, left side, and right side. The side may be determined by a direction of the movement of the camera.

A preset percentage of the first image may be removed from the display to leave the predetermined percentage in the display, the present percentage being in the range 75% to 95%. The preset percentage may be 85% and the predetermined percentage may be 15%.

All pixels in the blending area may be given a weight value representing visual importance. Pixels that form the boundary edges of the first and second images area may be given higher weight values. A boundary edge may be a collection or group of pixels that defines a clear separation of visual contrast within an image; and may further be the outlines of objects as opposed to a differently contrasted background.

A match status indicator may be displayed on the display, the match status indicator being variable in consequence of the result of the pixel matching process.

A determination of the side on which the blending area is to be displayed may be made after the pixel matching process. A subsequent preview image of a yet-to-be-taken subsequent photograph may have the side in common with a previous photograph. The previous photograph may be an immediately proceeding photograph.

According to a penultimate aspect there is provided method of forming a panoramic image using a camera. The method comprises taking a first photograph and displaying at least a portion of an image of the first photograph on a display; moving the camera for a second photograph and displaying at least a part of preview image of the second photograph on the display; conducting a pixel match for the portion and the part; and using a match status indicator to indicate a result of the pixel match.

The match status indicator may be variable in consequence of the pixel matching process, and may be of a first colour for a poor pixel match, a second colour for a good pixel match, and a third colour for a perfect pixel match; the first, second and third colours being different.

According to a final preferred aspect there is provided a computer useable medium comprising a computer program code that is configured to cause a processor in a camera to execute one or more functions to enable the performance of the above method.

BRIEF DESCRIPTION OF THE DRAWINGS

In order that the invention may be fully understood and readily put into practical effect, there shall now be described by way of non-limitative example only a preferred embodiment of the present invention, the description being with reference to the accompanying illustrative drawings in which.

DETAILED DESCRIPTION OF THE PREFERRED EMBODIMENTS

Figure 1:
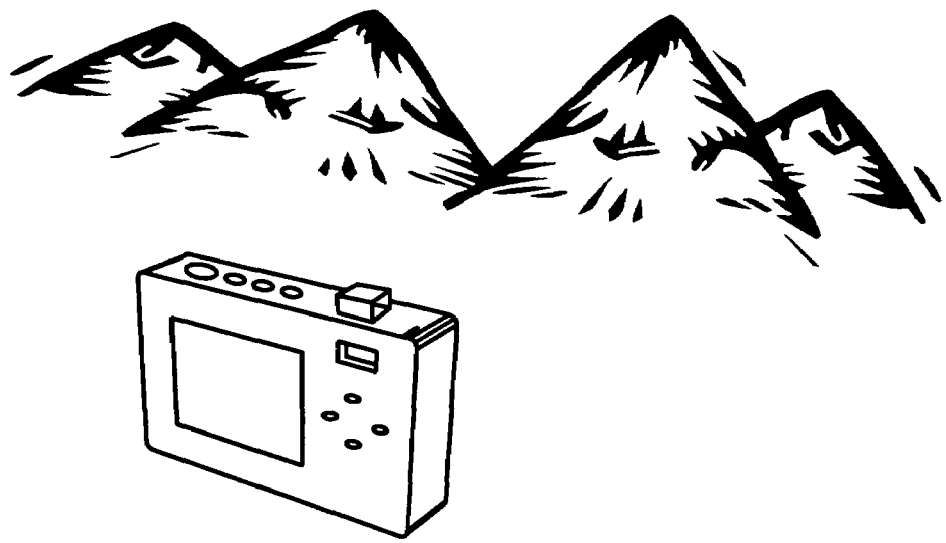
FIG. 1 is a schematic view of a camera according to the preferred embodiment about to take a panoramic photograph.
Figure 2:
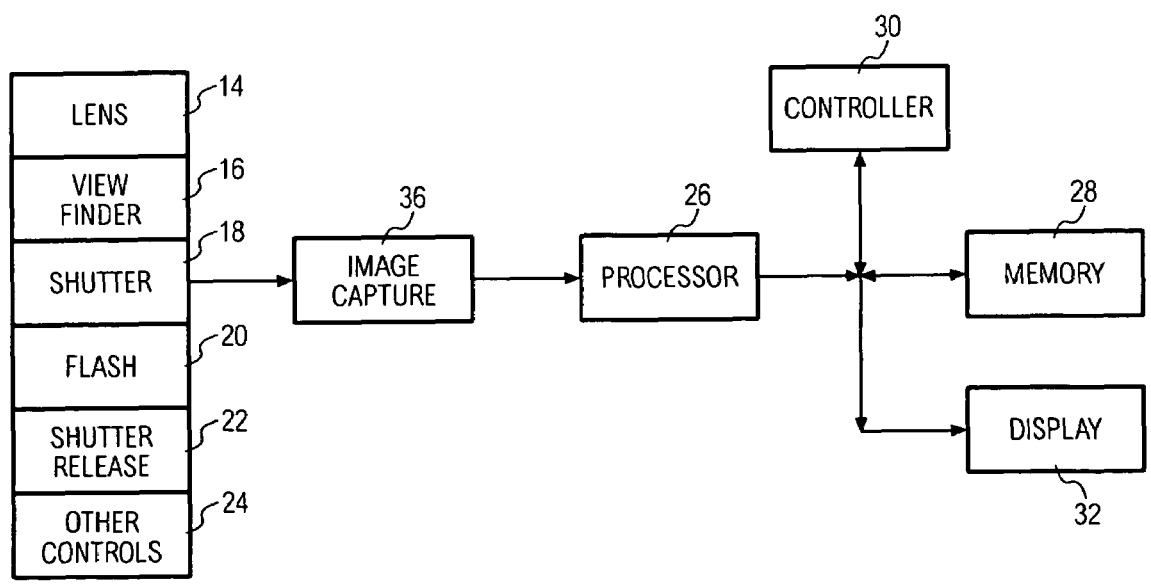
FIG. 2 is a block diagram of the camera of FIG. 1.

To refer to FIGS. 1 and 2 there is shown a camera 10 about to take a panoramic photograph of a vista 12. The camera 10 may be a digital or film camera, a digital camera built in to a mobile/cellular telephone or a personal digital assistant (PDA), or a web camera.

Although a simple form of digital still camera is shown, the present invention is further applicable to all forms of digital still cameras including single lens reflex cameras, and digital motion photograph cameras in still camera mode. The term "camera" is to be interpreted accordingly.

The camera 10 has an imaging system generally indicated as 12 and comprising a lens 14, view finder 16, shutter 18, built-in flash 20, shutter release 22, and other controls 24. Within the camera 10 is an image capturing device 36 such as, for example, a charge-coupled device; and a processor 26 for processing the image data received in a known manner, memory 28 for storing each image as image data, and a controller 30 for controlling data sent for display on display 32. Processor 26 performs conventional digital photographic image processing such as, for example, compressing and formatting a captured photographic image. The imaging system 12, including the image capturing device 36, is able to take and capture photographic images of every day scenes. The imaging system 12 may have a fixed or variable focus, zoom, and other functions found in digital still cameras.

Figure 3:
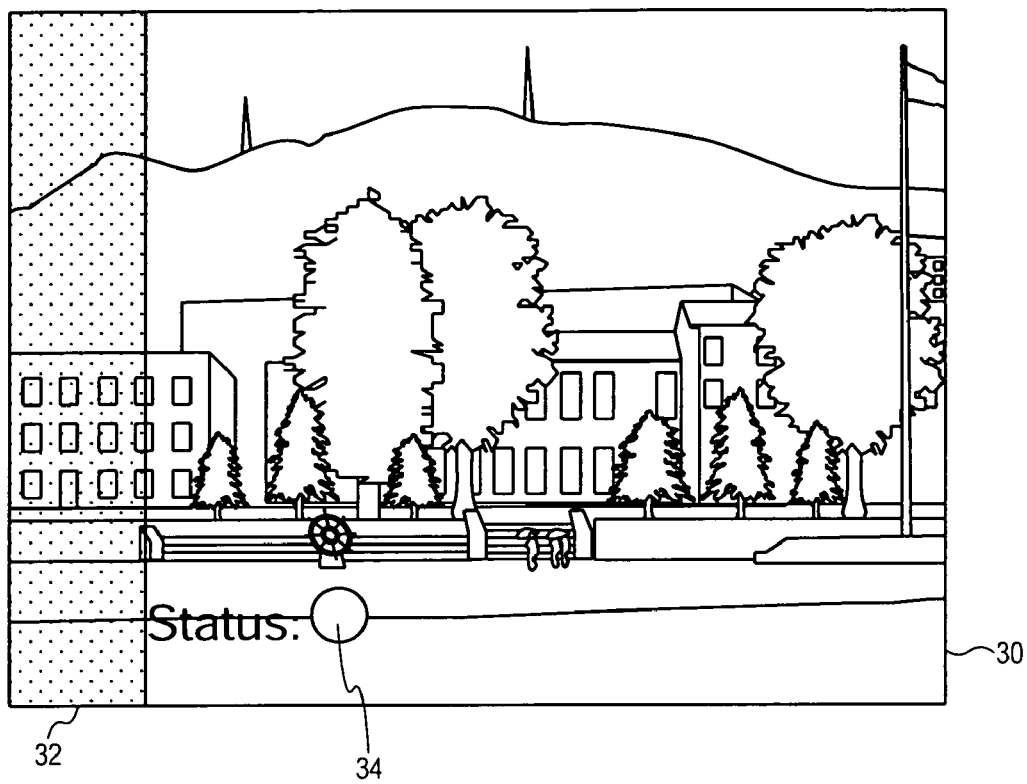
FIG. 3 is an image of a first photograph for the panoramic photograph.

When the camera 10 is set to a panoramic image or stitch assist mode to create a panoramic image, the first shot 30 as shown in FIG. 3 may be taken. The settings for the first shot will be fixed for the rest of the shots that make up the final panoramic image. Before the taking of each successive shot, the previously captured image will be moved towards the right for a predetermined percentage of its width. The predetermined percentage may be in the range 75% to 95% preferably 85%. The remaining portion is 5% to 25% of the image and is preferably 15% of the image. The remaining portion of the previously captured image will be blended with the image of the second photograph in a blending area 32.

The blending area 32 will normally be at a side of display 32, but it may be adjacent a side, or even remote from a side. Depending on the direction of the panoramic series capture sequence, the blending area 32 could reside at any of the four sides of the LCD display—top, bottom, left side or right side.

As shown in FIG. 3, the Red Green Blue ("RGB") value of the pixels for the first image within the blending area 32 will be reduced by a predetermined amount such as, for example, 40% to 60%, preferably 50%. Before the capturing of the next photograph the viewfinder and/or LCD display will show a preview of the image to be captured. The RGB value of the pixels within the blending area for the image to be captured will also be reduced by the same amount (e.g. 50%). The blending area 32 is thus made up of pixels from the previous and current images using additive blending with their reduced RGB values being added together. In order to differentiate the blending area from the rest of the LCD display, the summed RGB values are further reduced by a preset amount such as, for example, 5 to 25%, preferably 10%. The rest of the LCD display will present the current image without alteration.

Following is the display algorithm for blending area:

```
If (pixel P belongs to blending areas) then
   RGB [LCD] P=(RGB [image (previous)[ P × 0.5 + RGB [preview]
   P × 0.5) × 0.9
            //multiple 0.9 makes blending area 10 percent dark
   else
   RGB [LCD] P = RGB [preview] P
```

For example a 2" LCD may have 206,000 pixels. In such a case the blending area will consist of 30,900 pixels. The blending and matching processes applies only to the pixels within the blending area. Therefore, to process in a stitch assist mode where tone is blending the display process, to calculate the match status only 30,900 pixels are involved.

A status indicator 34 is provided on the image 30 and the color of the status indicator 34 provides an indication of how well the previously captured image 30 and the current preview image 36 match within the blending area 32. For example, a red color may represent poor matching, a yellow color may represent partial matching, and a green color may represent perfect matching.

Depending on the accuracy desired, the number of pixels within the blending area used in determining the matching status could be varied. The highest accuracy is obtained when all the pixels within the blending area are considered during the match process.

Each pixel used in the matching process is given a weight value to represent its visual importance. It is preferable not to use equal weighting for all the pixels because certain pixels that make up boundary edges are visually more important. The following is how each pixel's weight value (W) and matching value (M) can be computed:

The pixels subset in the blending area used is defined at MP. M means the matching status to be used to evaluate the result of the matching. A small value represents good matching. This value is used to determine the color of the matching status index.

Denote P (i, j) for the i row and j column pixel on the blending area. W(i, j) for the weight of pixel P (i, j).

To compute pixel's weight value:

```
s = 1;   //the pixel step for calculate weight
for((i,j) ∈ MP)
    W(i, j) = 0;
    for(int u=-1; u<2;u++)
        for(int v=-1; v<2;v++)
            W(i, j) = W(i, j)+abs(R [image(previous)] p(i+s*u,j+s*v)
                     −R [image(previous)] p(i,j))
```

-continued

```
        +abs(G [image(previous)] p(i+s*u,j+s*v)
            −G [image(previous)] p(i,j))
        +abs(B [image(previous)] p(i+s*u,j+s*v)
            −B [image(previous)] p(i,j));
W__max = max(W(i,j), (i,j) ∈ MP)
W(i, j) = W(i, j)/W__max;    // P pixel's weight value W
```

To compute matching value:

Method 1:

```
M = 0;   //M is the matching value
for((i,j) ∈ MP)
    M = M + W(i,j)* (abs(R [image(preview)] p(i,j)
            −R [image(previous)] p(i,j))
        +abs(G [image(preview)] p(i,j)
            − G [image(previous)] p(i,j))
        +abs(B [image(preview)] p(i,j)
            −B [image(previous)] p(i,j)));
M = M/nPixel;
R [image(previous)]p(i,j) meant previous image at pixel P(i,j) Red
value;
G [image(previous)]p(i,j) meant previous image at pixel P(i,j) Green
value;
B [image(previous)]p(i,j) meant previous image at pixel P(i,j) Blue
value;
R [image(preview)]p(i,j) meant preview image at pixel P(i,j) Red
value;
G [image(preview)]p(i,j) meant preview image at pixel P(i,j) Green
value;
B [image(preview)]p(i,j) meant preview image at pixel P(i,j) Blue
value;
nPixel meant number of MP;
```

Method 2:

```
M=0;
for((i,j) ∈ MP)
    M = M +abs(W[image(preview)]p(i,j)−W[image(previous)]p(i,j))
M = M/nPixel;
W[image(previous)]p(i,j) meant previous image at pixel P(i,j) weight
value;
W[image(preview)]p(i,j) meant preview image at pixel P(i,j) weight
value;
nPixel meant number of MP;
```

Method 1 is faster than method 2 because it doesn't need calculate the preview image pixels' weight But method 2 is more accurate because it detects the boundary edges' information for matching. Therefore, even under different lighting conditions method 2 may achieve a good result, whereas under different lighting conditions method 1 may not.

The use of automated pixel-matching together with an on-screen blending area as a visual guidance minimizes human errors while allowing manual intervention when the automated pixel-matching does not provide a satisfactory result. For example, it may not be possible for the pixel-matching algorithm to provide a good result if there are moving objects across successive shots. A moving car may be present in the previous shot but may not be present in the current shot. In this situation, it would be impossible for the automated pixel-matching to provide a satisfactory result. However, the user will be able to use the visual guidance to provide a rough match between the images and ignore the result from the automated pixel-matching.

On the other hand, it is usually very difficult for user to properly match the images when the objects in the scene are small and/or not distinct, (e.g. forest, clouds). In such a situation, the automated pixel-matching will be able to provide a more accurate guide as to whether a photograph can be taken.

To now refer to FIGS. 3 to 8, when the camera is set to stitch assist mode (801) the status indicator 34 is displayed and is red (824) in colour to indicate that the next photograph should not be taken. When the first shot 30 is taken (802), the camera can than be moved for the next shot (803). The image displayed is moved by the predetermined amount (e.g. 85%) and the blending area 32 is formed (804).

The number of pixels in the blending area 32 is also reduced by 50% (805).

Figure 4:
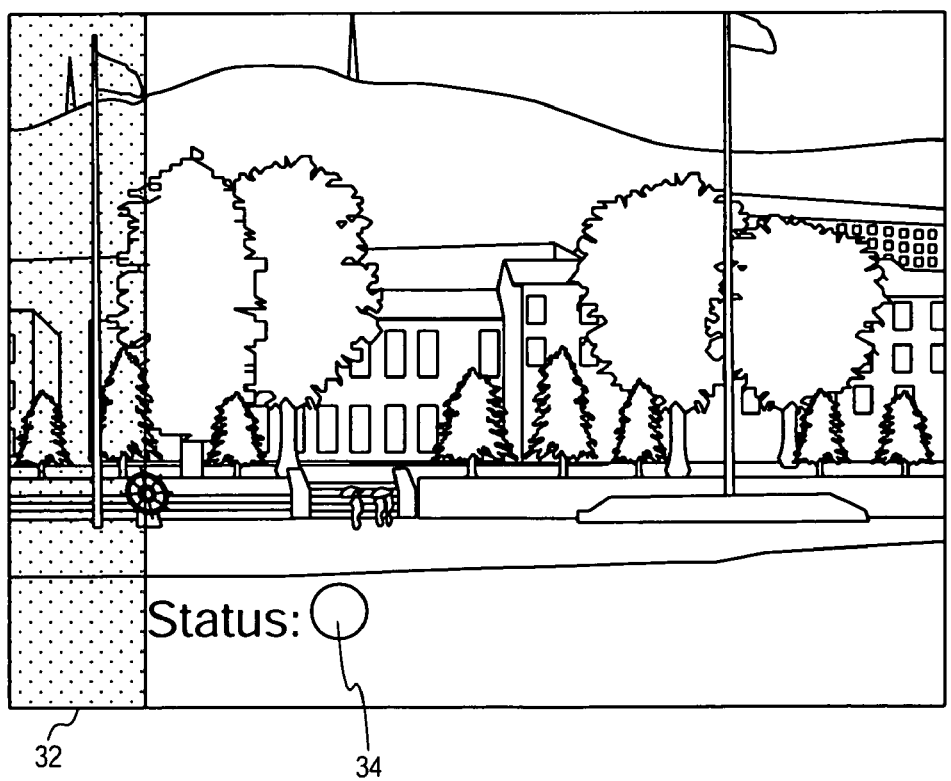
FIG. 4 is an image prior to the taking of a second photograph for the panoramic photograph.
Figure 5:
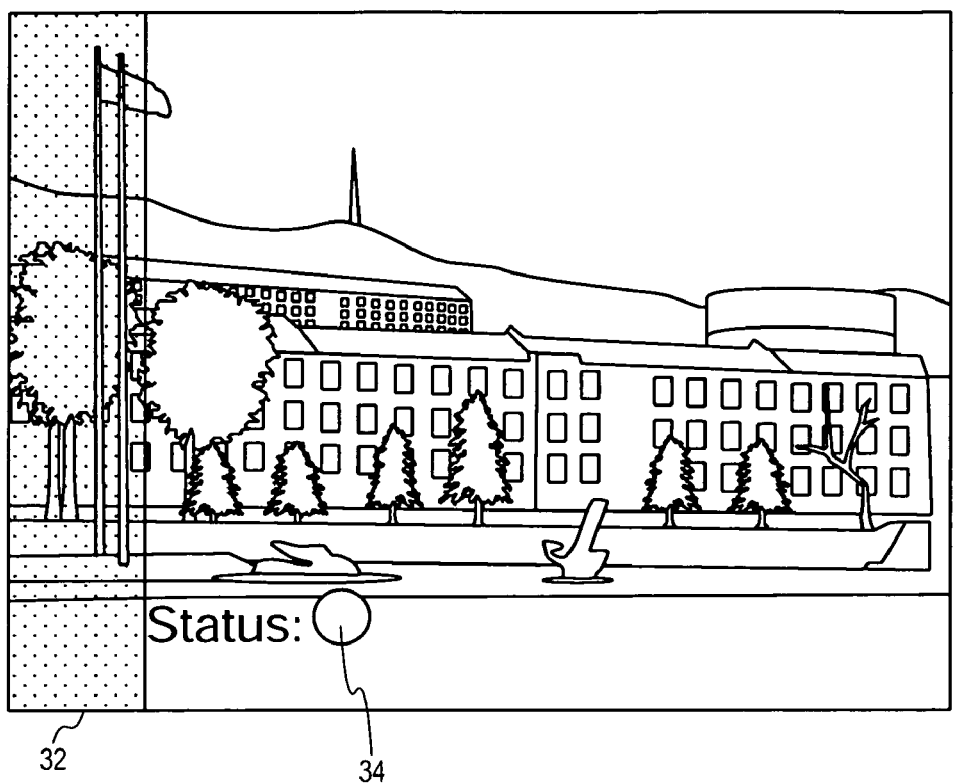
FIG. 5 is an image corresponding to FIG. 4 with the image closer to a match.
Figure 6:
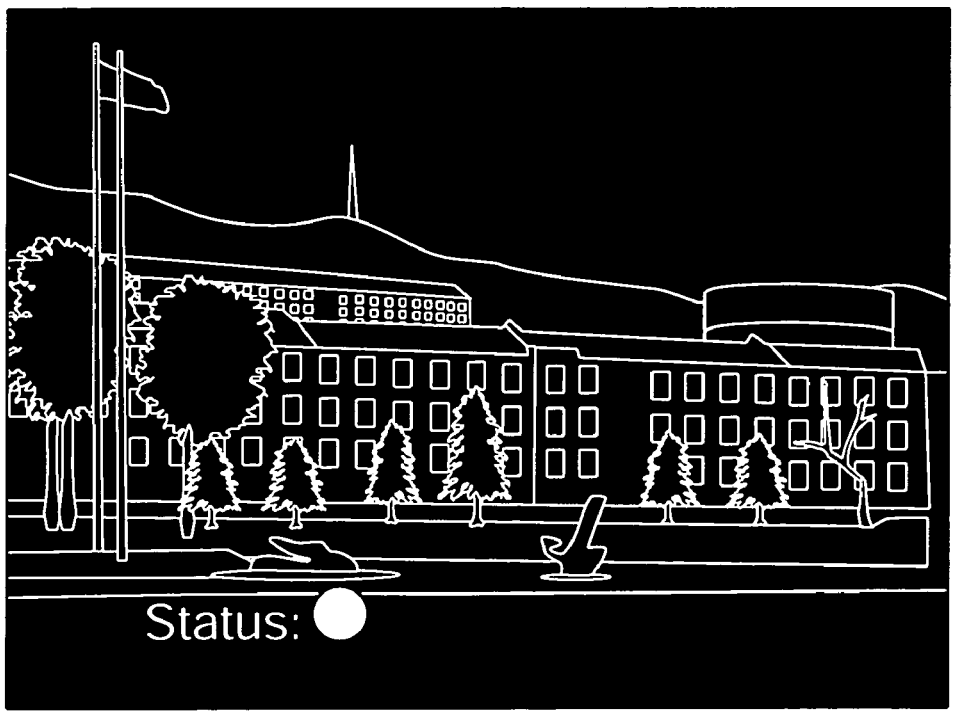
FIG. 6 is an image showing the weights photograph for the image of FIG. 5.

At step (802) what is displayed is as shown in FIG. 4. As can be seen the flag pole that was on the right in FIG. 3 and thus is on the left in FIG. 4 and is in the blended area 32. When the camera is moved is step (803) what is displayed is shown in FIG. 5. As can be seen, in the blended area 32 are two images of the flagpole—one from the portion of the first image that remains in the blending area 32, and one from the yet-to-be-taken second image that forms the majority of the displayed image.

The pixel matching process described above is then performed (806) only within the blending area 32. For the purposes of the status indicator 34, queries 807, 809 and 811 are raised to determine the match status. If NO at 807 and 809 (808 and 810 respectively) and YES (812) at (811), the status indicator 34 is displayed as red (813) to indicate a poor or bad match. The camera is then moved (814) until there is a visual matching of features in the blending area 32. The process then reverts back to (806).

Figure 7:
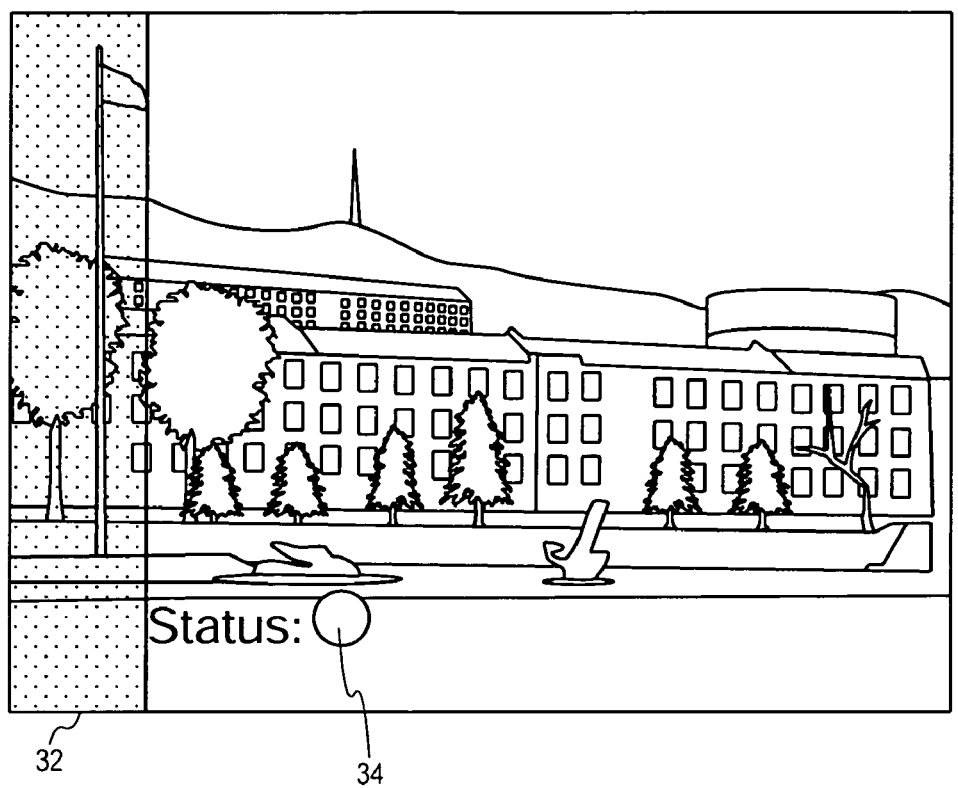
FIG. 7 is an image corresponding to FIGS. 4 and 5 at the completion of the match.

If at (809) the answer is YES, the status indicator 34 is displayed as yellow (FIG. 5) indicating a good, but not perfect match. The camera may be moved (825) to try to achieve an improved match, and the process reverts to (806). This is shown in FIG. 7. At this stage the images of the flagpole are aligned. Therefore, in (807) the answer is YES (817) and the display indicator 34 is changed to green (818) and the next photograph is able to be taken (819).

If there are no more photographs to be taken to form the panoramic image (820, 812) the process ends (823). If there are more photographs (821), the process reverts to (803).

At (816), it may be possible to take the next photograph as there is a sufficiently good match for stitching to take place.

If desired, there may be included a shutter release lockout so that when camera 10 is in the panoramic mode and the second photograph is to be taken, if the status indicator 34 is red the second photograph cannot be taken. This would also be relevant for subsequent photographs.

A different situation arises when the panoramic image is not formed from a single line sequence of photographs due to the camera moving in one direction only such as, for example, left to right, right to left, top to bottom, or bottom to top. In these instances the blending area 32 is always in the one location within display 32—left side, right side, top side, and bottom side respectively. If the camera is to take a sequence of photographs to form a panoramic image and the camera is moved in different directions, stitching will need to take place on different side of images. For example, a panoramic image of a large mountain may require several photographs in a grid:

TABLE 1

| 1 | 2 | 3 |
|---|---|---|
| 6 | 5 | 4 |
| 7 | 8 | 9 |

The order or sequence of the photographs taken may be different, and may be random. Normal stitching systems can't cope with such an arrangement.

Figure 15:
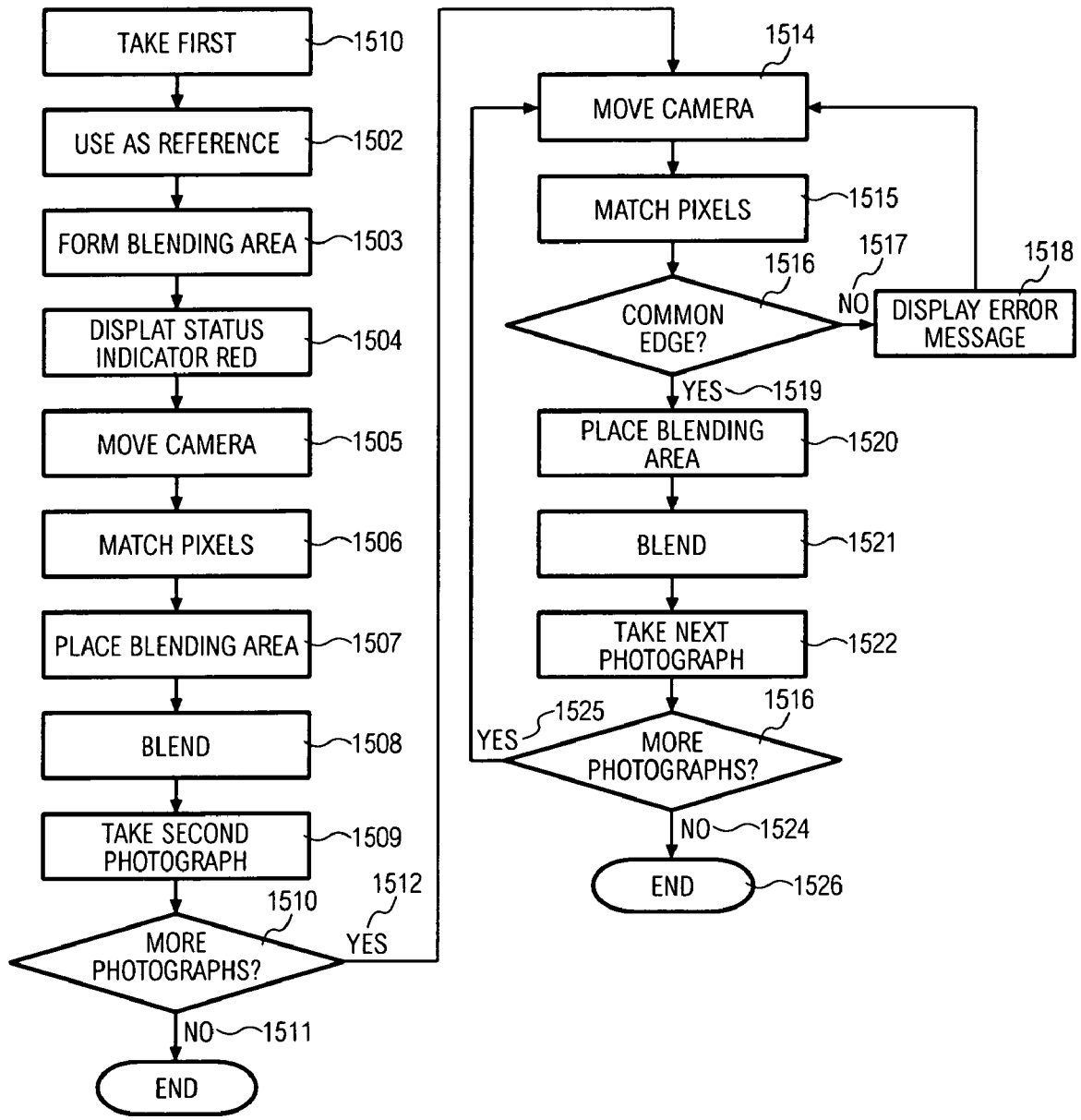
FIG. 15 is a flow chart for the method of the second embodiment.

To enable to stitching to take place the process of FIG. 15 is followed. One photograph is taken (1501) and its image is used as the first image (1502) for stitching to take place. The blending area 32 is then formed (1503) and placed on the display, and the status indicator 34 displayed as red (1504). The camera 10 is then moved (1505) and the pixel matching process is performed in the blending area (1506) as is described above in relation to the first embodiment. If the first image is 1 in Table 1, the blending area 32 will be on the right side of the first image and on the left side of the second image.

In consequence of the pixel match, the blending area 32 is moved to be on the correct side of the display (1507) so that blending can take place as described above (1508) in relation to the first embodiment. The second photograph is then taken. A query is raised (150) to determine if more photographs are required. If yes (1512), the process continues to (1514). If no (1511), the process ends.

If yes, the camera is then moved (1514) and a pixel match attempted (1515). In doing so a common edge between a previous image and the image to be taken must be found (1516). If there is no common or overlapping edge with a previous photograph (1517), an error message is displayed (1518) and the process reverts to (1514). The previous photograph may be any previous photograph taken as part of the image sequence to from the panoramic image; or may be limited to the immediately previous image, particularly if memory and/or processing power is limited.

Using the above Table 1 as an example, the order of photographs may be in any sequence. Each subsequent photograph must have a common side with the photograph taken prior to it for stitching to take place. For example, if photograph 6 were the first photograph, only photographs 1, 5 and 7 could be used for the second photograph. If photograph 5 is the second photograph, any one of photographs 12, 4, 7 or 8 could be the third photograph as each has an edge in common with photograph 6 or photograph 5. However, photographs 3 and 9 could not be the third photograph as they have no common edge with photograph 6 or photograph 5. Therefore, the photographs can be taken in any order provided there is a common edge with a previous photograph.

If at (1516) the answer is yes (1519) the blending area 32 is located on the correct side as is described above (1520), the blending process followed as is described in relation to the first embodiment (1521); and the photograph taken (1522). A query is raised (1523) to determine if more photographs are to be taken. If yes (1525) the process reverts to (1514), if no (1524) the process ends (1526).

The first photograph may be taken from a library or card of precedent photographs. As such precedent photographs may have very high resolution and high megapixels so a low megapixel camera may be able to be used to from a high megapixel image.

This embodiment is illustrated in FIGS. 9 to 14 and is for creating images and stitching them together. The purpose is to create a large, high quality image (not just panoramic images) by using a low mega-pixels digital camera to take a high mega-pixels photograph.

Figure 9:
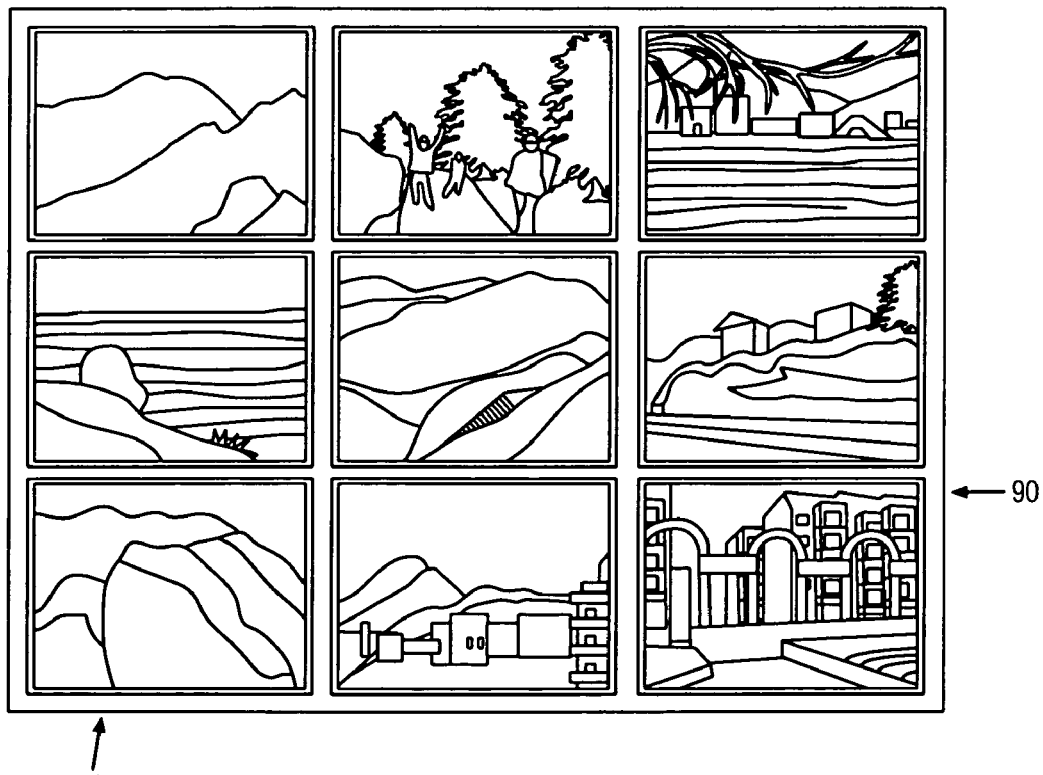
FIG. 9 is an example of reference images for a second embodiment.
Figure 8:
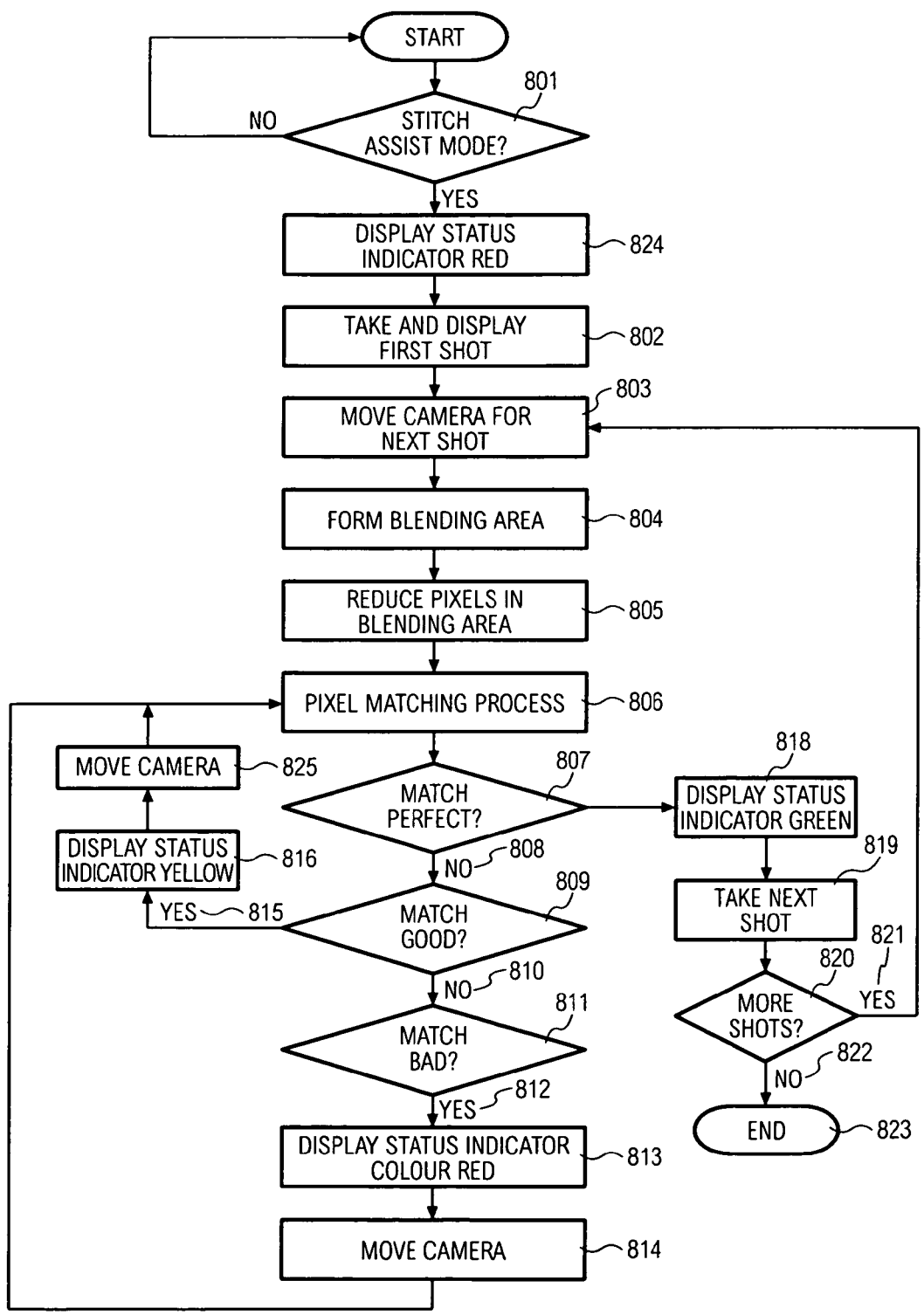
FIG. 8 is a flow chart for the method of the first embodiment.
Figure 10:
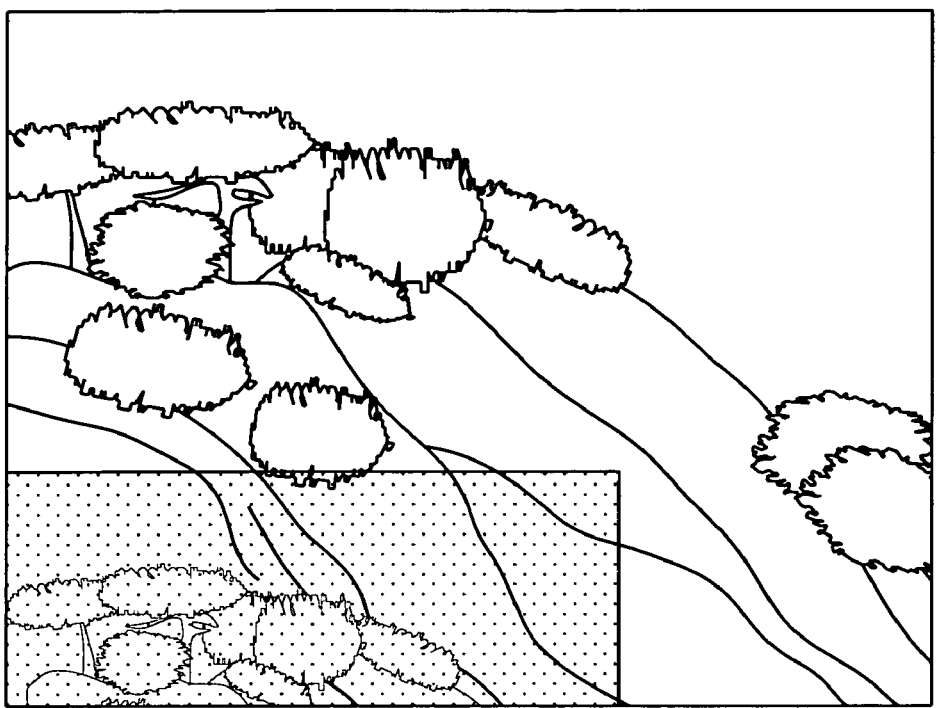
FIG. 10 is an image of a selected reference image from the reference image of FIG. 9.
Figure 11:
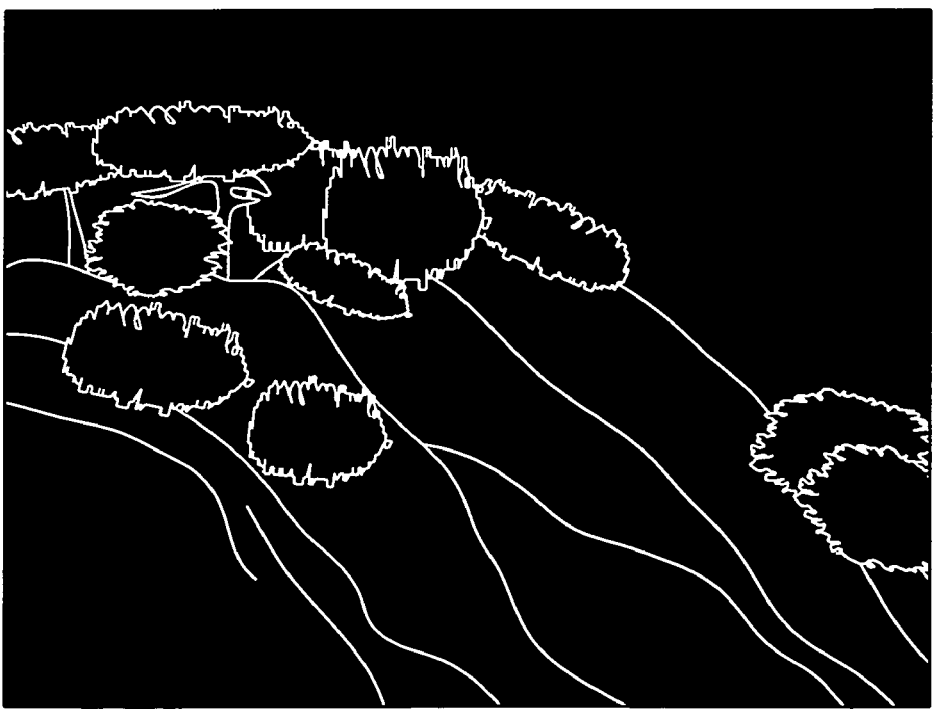
FIG. 11 is a weight's photograph of the reference image of FIG. 10.
Figure 12:
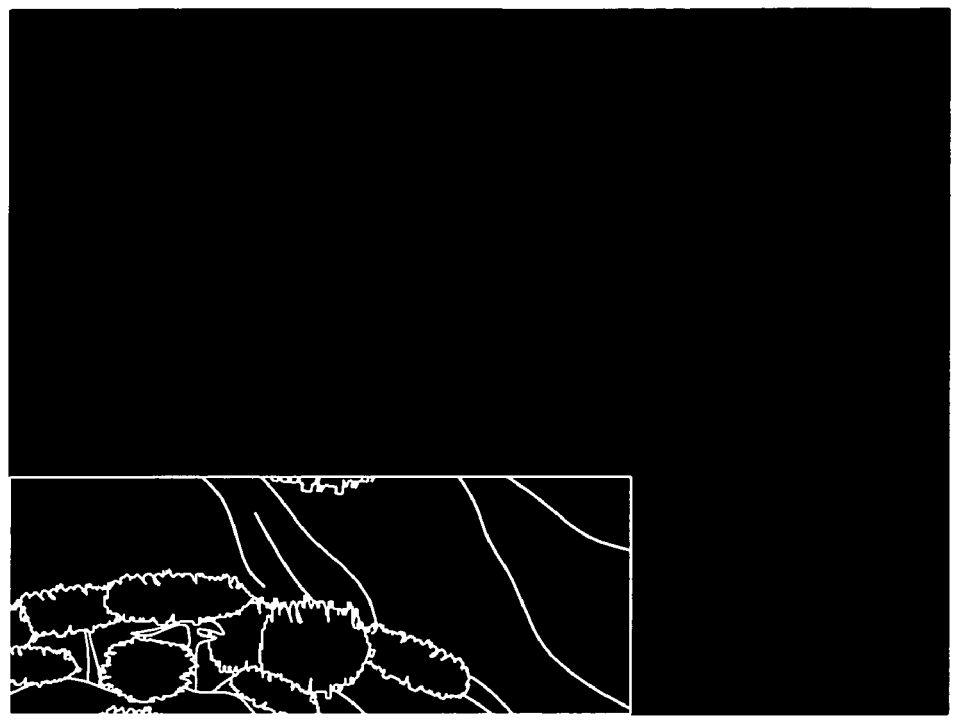
FIG. 12 is a weight's photograph of the stitching portion of the reference image of FIG. 10.
Figure 13:
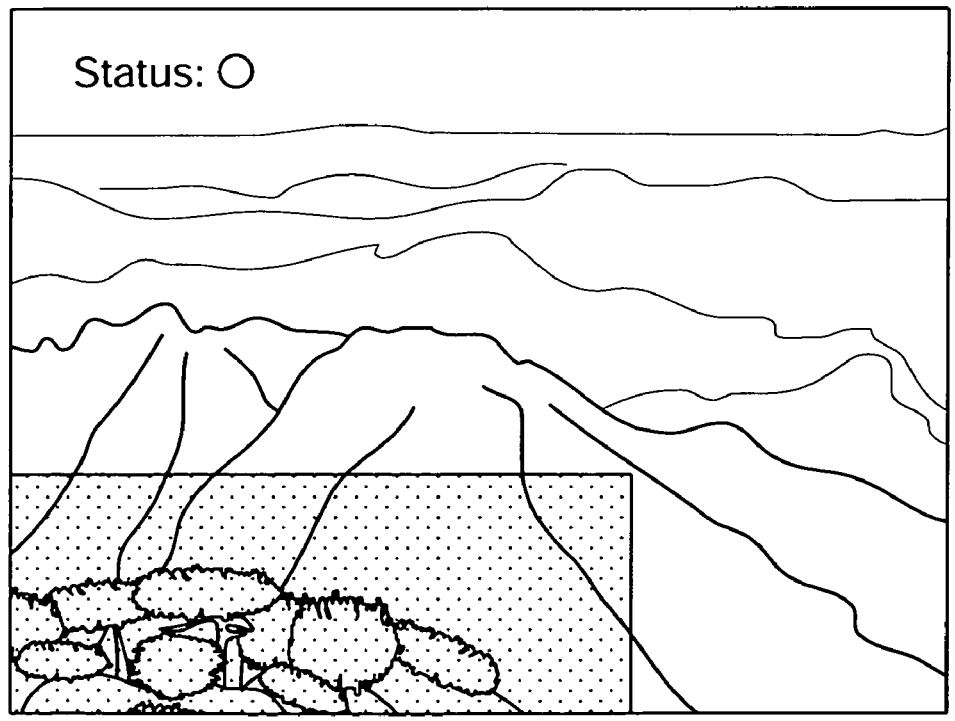
FIG. 13 is an image of the matching status.
Figure 14:
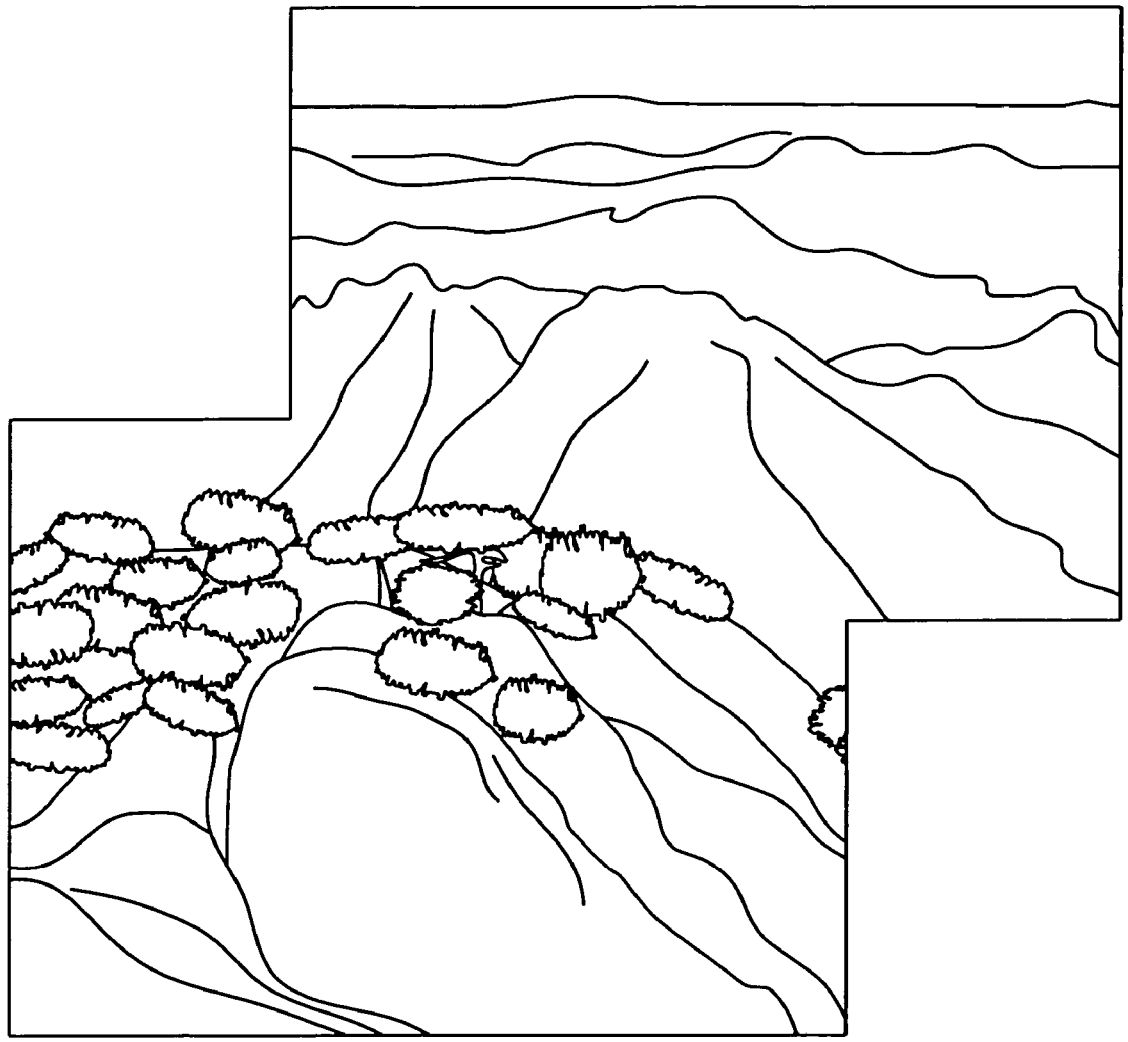
FIG. 14 is the first stitched image of the second embodiment.

First and as shown in FIG. 9, a precedent card 90 is provided. One photograph 92 from the precedent card is selected as a precedent photograph. The precedent photograph is adjusted to a desired position on the LCD screen or viewfinder. Part of the precedent photograph 92 in the LCD is the blending area 32 (FIG. 10). The preview image about to be taken is matched to the precedent image in the blending area 32 using the matching methods as in the first embodiment described above and as shown in FIGS. 10 to 14. FIG. 14 shows the first image.

After taking a certain number of photographs, the photograph stitch software is used to stitch them together on computer to create a large and high quality photograph.

For all embodiments, the status indicator 34 may be accompanied by an audible indication such as, for example, a "beep" at a low repetition frequency corresponding to the red colour and a poor match; the "beep" at middle repetition frequency corresponding to the yellow colour and a good match; and the "beep" at a high repetition frequency corresponding to the green colour and perfect match.

Whilst there has been described in the foregoing description preferred embodiments of the present invention, it will be understood by those skilled in the technology that many variations or modifications in details of design or construction or operation may be made without departing from the present invention.

The invention claimed is:

1. A method for forming a panoramic image using a camera, the method comprising:
    taking a first photograph using the camera and displaying a first image of the first photograph on a display of the camera;
    forming a blending area on the display, the blending area comprising a portion of the first image of the first photograph as displayed on the display;
    moving the camera before taking a second photograph and displaying on the display a preview image of a yet-to-be-taken second photograph;
    using a pixel matching process for determining an alignment of the portion of the first image in the blending area and a part of the preview image corresponding to the blending area, the alignment being represented as a matching value indicative of matching quality;
    providing all pixels in the blending area with a weight value representing visual importance, pixels that form the boundary edges of the first and preview images being given higher weight values; and
    calculating the matching value using the weight values of all pixels in the blending area during the pixel matching process.

2. A method as claimed in claim 1, wherein the blending area comprises a predetermined percentage of the first image, the predetermined percentage being in the range 5% to 25%.

3. A method as claimed in claim 2, wherein a preset percentage of the first image is removed from the display to leave the predetermined percentage in the display, the preset percentage being in the range 75% to 95%.

4. A method as claimed in claim 3, wherein the preset percentage is 85% and the predetermined percentage is 15%.

5. A method as claimed in claim 1, wherein red, green and blue values of all pixels in the blending area are reduced to a fixed amount, the fixed amount being in the range 40% to 60%.

6. A method as claimed in claim 5, wherein the red, green and blue values of the pixels of the portion of the first image in the blending area, and the red, green and blue values of the pixels of the part of the preview image in the blending area are summed for display on the display prior to being reduced; and after summing and reduction, the pixels in the blending area are further reduced by a set amount.

7. A method as claimed in claim 6, wherein the set amount is 10% and the fixed amount is 45%.

8. A method as claimed in claim 1, further comprising displaying on the display a match syaus indicator, the match status indicator being variable according to the matching value and indicative of matching quality between the portion of the first image and the part of the preview image.

9. A method as claimed in claim 1, wherein blending area is at adjacent a side of the display, the side being selected from the group consisting of: top, bottom, left side, and right side; the side being determined by a direction of the movement of the camera.

10. A method as claimed in claim 9, wherein a determination of the side is made after the pixel matching process.

11. A method as claimed in claim 10, wherein the previous photograph is an immediately proceeding photograph.

12. A method as claimed in claim 1, wherein a boundary edge is a collection of pixels that define a clear separation of visual contrast within an image; and includes outlines of objects as opposed to a differently contrasted background.

13. A method as claimed in claim 12, wherein a preview image of a yet-to-be-taken subsequent photograph has a side in common with an image of a previous photograph.

14. A computer readable medium having a computer program means embodied in said medium, wherein the computer program code means is configured to cause a processor in a camera to execute one or more functions to enable the performance of the method of claim 1.

15. A method of forming a panoramic image using a camera, the method comprising:
 taking a first photograph and displaying at least a portion of an image of the first photograph on a display;
 moving the camera for a second photograph and displaying at least a part of preview image of the second photograph on the display;
 providing all pixels in the portion of the first photograph and the part of the preview image of the second photograph with a weight value representing visual importance, pixels that form the boundary edges of the portion and the part being given higher weight values;
 calculating a matching value indicative of matching quality between the portion and the part using the weight values of all pixels in the portion and the part; and
 displaying a match status indicator variable according to the matching value to indicate a result of pixel match between the portion and the part.

16. A computer readable medium having a computer program means embodied in said medium, wherein the computer program code means is configured to cause a processor in a camera to execute one or more functions to enable the performance of the method of claim 15.

17. A method of forming a panoramic image using a camera, the method comprising:
 taking a first photograph and displaying at least a portion of an image of the first photograph on a display;
 moving the camera for a second photograph and displaying at least a part of preview image of the second photograph on the display;
 conducting a pixel match for the portion and the part; and
 using a match status indicator to indicate a result of the pixel match, wherein the match status indicator is variable in consequence of the pixel matching process and is of a first colour for a poor pixel match, a second colour for a good pixel match, and a third colour for a perfect pixel match; the first, second and third colours being different.

18. A camera for taking a panoramic image, the camera comprising:
 (a) a body;
 (b) a lens;
 (c) a display;
 (d) an image capturing device;
 (e) a processor;
 (f) a controller; and
 (g) a memory;
 wherein the display is configured to display images of photographs,
 wherein the processor is configured to form on the display a blending area and to conduct a pixel match for determining an alignment of a portion of a first image in the blending area with a part of a second image, the first image being a taken photograph and the second image being a yet-to-be-taken photograph, the alignment being represented as a matching value indicative of matching quality;
 wherein during the pixel matching, all pixels in the blending area are given a weight value representing visual importance, the weight values of all pixels in the blending area are used in the calculation of the matching value, and pixels that form the boundary edges of the first and preview images are given higher weight values.

19. A camera as claimed in claim 18, wherein the blending area comprises a predetermined percentage of the first image, the predetermined percentage being in the range 5% to 25%.

20. A camera as claimed in claim 19, wherein a present percentage of the first image is removed from the display to leave the predetermined percentage in the display, the present percentage being in the range 75% to 95%.

21. A camera as claimed in claim 20, wherein the preset percentage is 85% and the predetermined percentage is 15%.

22. A camera as claimed in claim 18, wherein red, green and blue values of all pixels in the blending area are reduced by a fixed amount, the fixed amount being in the range 40% to 60%.

23. A camera as claimed in claim 22, wherein the red, green and blue values of the pixels of the portion of the first image, and the red, green and blue values of the pixels of the part of the second image in the blending area are summed for display on the display prior to being reduced; and after summing and reduction, pixels in the blending area are further reduced by a set amount.

24. A camera as claimed in claim 23, wherein the set amount is 10% and the fixed amount is 50%.

25. A camera as claimed in claim 18, wherein the processor is configured to form on the display a match status indicator, the match status indicator being variable according to the matching value and indicative of matching quality between the portion of the first image and the part of the second image.

26. A camera as claimed in claim 18, wherein the blending area is at adjacent a side of the display, the side being selected from the group consisting of: top, bottom, left side, and right side; the side being determined by a direction of movement of the camera between the first and second photographs.

* * * * *